US010631459B2

(12) United States Patent
Mullet et al.

(10) Patent No.: US 10,631,459 B2
(45) Date of Patent: Apr. 28, 2020

(54) STAND-ON MOWER WITH WINGED DECK (71) Applicant: Excel Industries, Inc., Hesston, KS (US)

(72) Inventors: Paul W. Mullet, Sarasota, FL (US); Brian R. Funk, Goessel, KS (US); Robert C. Esau, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 128 days.

(21) Appl. No.: 15/970,027

(22) Filed: May 3, 2018

(65) Prior Publication Data

US 2018/0249630 A1    Sep. 6, 2018

Related U.S. Application Data (63) Continuation of application No. 15/209,481, filed on Jul. 13, 2016, now Pat. No. 10,051,786.

(51) Int. Cl.
*A01D 34/81* (2006.01)
*A01D 34/66* (2006.01)
*A01D 101/00* (2006.01)

(52) U.S. Cl.
CPC ............ *A01D 34/81* (2013.01); *A01D 34/66* (2013.01); *A01D 2101/00* (2013.01)

(58) Field of Classification Search
CPC ..... A01D 34/81; A01D 34/66; A01D 2101/00
See application file for complete search history.

(56) References Cited

U.S. PATENT DOCUMENTS

| 3,152,431 | A |   | 10/1964 | Ott et al. |
|---|---|---|---|---|
| 3,339,353 | A | * | 9/1967  | Schreyer ............. A01D 34/661 56/6 |
| 4,395,865 | A |   | 8/1983  | Davis, Jr. et al. |
| 4,497,160 | A | * | 2/1985  | Mullet .................. A01D 75/30 56/11.6 |
| 4,878,339 | A |   | 11/1989 | Marier et al. |
| 4,920,733 | A | * | 5/1990  | Berrios ................. A01D 34/69 56/10.9 |
| 5,177,942 | A | * | 1/1993  | Hager ................. A01D 34/662 56/11.6 |
| 5,233,817 | A | * | 8/1993  | Nicol .................. A01D 75/303 56/14.7 |
| 5,337,543 | A |   | 8/1994  | Kitamura et al. |
| 5,463,853 | A |   | 11/1995 | Santoli et al. |
| 5,507,138 | A |   | 4/1996  | Wright et al. |
| 5,653,466 | A |   | 8/1997  | Berrios |

(Continued)

OTHER PUBLICATIONS

Hustler Range Wing Rotary Gang Mower, Hustler Turf & Ground Equipment, Excel Industries, Inc. 1988.

(Continued)

*Primary Examiner* — Arpad Fabian-Kovacs
(74) *Attorney, Agent, or Firm* — Shook, Hardy & Bacon LLP (57) ABSTRACT

A stand-on mower may have a deck with at least one deck wing. The mower may include a stand-on operator platform, a rear wheel axis positioned forward of the stand-on operator platform, a main deck having main deck blades with rotational axes positioned forward of the rear wheel axis, one or more deck wings, and front wheels positioned forward of the rotational axes of the main deck blades.

12 Claims, 9 Drawing Sheets

(56) References Cited

U.S. PATENT DOCUMENTS

| | | | |
|---|---|---|---|
| 5,697,623 A | 12/1997 | Bermes et al. | |
| 5,771,669 A * | 6/1998 | Langworthy | A01D 75/306 56/15.8 |
| 5,809,756 A | 9/1998 | Scag et al. | |
| 5,845,475 A * | 12/1998 | Busboom | A01D 34/005 56/320.1 |
| 5,984,031 A | 11/1999 | Velke et al. | |
| 6,065,274 A | 5/2000 | Laskowski et al. | |
| 6,073,430 A * | 6/2000 | Mullet | A01D 34/685 56/12.8 |
| 6,185,920 B1 | 2/2001 | Oxley | |
| 6,192,666 B1 * | 2/2001 | Sugden | A01D 43/077 56/13.6 |
| 6,308,503 B1 * | 10/2001 | Scag | A01D 34/685 56/16.9 |
| 6,438,930 B1 | 8/2002 | Velke et al. | |
| 6,438,931 B1 | 8/2002 | Velke et al. | |
| 6,442,917 B1 | 9/2002 | Velke et al. | |
| 6,490,849 B1 | 12/2002 | Scag et al. | |
| 6,499,282 B1 | 12/2002 | Velke et al. | |
| 6,550,242 B2 | 4/2003 | Abend et al. | |
| 6,648,095 B2 | 11/2003 | Abend et al. | |
| 6,684,615 B1 * | 2/2004 | Bland | A01D 34/661 56/15.6 |
| 6,688,090 B2 | 2/2004 | Velke et al. | |
| 6,782,964 B1 | 8/2004 | Korthals et al. | |
| 6,796,112 B1 * | 9/2004 | Price | A01D 34/661 56/14.9 |
| 6,868,657 B2 | 3/2005 | Bauer et al. | |
| 6,935,092 B2 * | 8/2005 | Velke | A01D 34/6806 56/14.7 |
| 7,047,716 B2 | 5/2006 | Lang | |
| 7,069,712 B2 * | 7/2006 | Bauer | A01D 34/71 56/12.8 |
| 7,089,722 B2 * | 8/2006 | Laskowski | A01D 34/66 56/14.9 |
| 7,240,474 B2 * | 7/2007 | Buss | A01D 43/077 56/12.8 |
| 7,313,902 B1 * | 1/2008 | Eavenson, Sr. | A01D 34/661 56/13.6 |
| 7,318,311 B2 | 1/2008 | Wright et al. | |
| 7,325,388 B2 | 2/2008 | Wright et al. | |
| 7,841,157 B2 | 11/2010 | Latuszek et al. | |
| 7,942,224 B2 | 5/2011 | Marshall et al. | |
| 8,141,886 B1 | 3/2012 | Sugden et al. | |
| 8,490,374 B2 | 7/2013 | Latuszek et al. | |
| 9,021,776 B2 | 5/2015 | Zwieg et al. | |
| 9,485,906 B2 | 11/2016 | Pflanzer et al. | |
| 9,723,781 B1 * | 8/2017 | Covington | A01D 34/74 |
| 2001/0001170 A1 | 5/2001 | Velke et al. | |
| 2002/0059788 A1 | 5/2002 | Velke et al. | |
| 2002/0189223 A1 | 12/2002 | Degelman et al. | |
| 2004/0182057 A1 | 9/2004 | Price | |
| 2005/0126146 A1 * | 6/2005 | Velke | A01D 34/82 56/16.7 |
| 2006/0070365 A1 | 4/2006 | Laskowski | |
| 2006/0070366 A1 | 4/2006 | Laskowski | |
| 2008/0196374 A1 | 8/2008 | Gamble et al. | |
| 2009/0302562 A1 | 12/2009 | Kallevig et al. | |
| 2010/0126792 A1 | 5/2010 | Kallevig | |
| 2011/0277434 A1 | 11/2011 | Jackson et al. | |
| 2012/0000172 A1 | 1/2012 | Papke et al. | |
| 2012/0000173 A1 | 1/2012 | Papke et al. | |
| 2014/0174838 A1 | 6/2014 | Oswald et al. | |
| 2015/0007542 A1 * | 1/2015 | Oswald | A01D 34/001 56/10.8 |
| 2015/0128548 A1 | 5/2015 | Andre et al. | |
| 2015/0359169 A1 | 12/2015 | Weems et al. | |

OTHER PUBLICATIONS

Toro Groundsmaster 455-D Operator's Manual, The Toro Company, 2000.

\* cited by examiner

STAND-ON MOWER WITH WINGED DECK

CROSS-REFERENCE TO RELATED APPLICATIONS

This application is a continuation of, and claims priority to, pending U.S. Nonprovisional application Ser. No. 15/209,481 filed Jul. 13, 2016, the disclosure of which is hereby incorporated by reference in its entirety for any and all purposes.

FIELD

Aspects provided relate to a stand-on mower. More particularly, aspects herein relate to stand-on mower with a winged deck.

BACKGROUND

Traditionally, stand-on lawnmowers (mowers having a platform for supporting the feet of an operator that stands during operation) have been limited to a single deck with limited cutting width. The limitations on deck size have resulted, in some cases, from the configuration of the components of previous stand-on mowers, and the resultant weight distribution.

SUMMARY

Aspects hereof relate to a stand-on mower having a deck with at least one deck wing. The mower includes a frame and a stand-on operator platform positioned proximate a rear frame end. The mower may be a zero-turn mower having a pair of driven rear wheels, each having a rotational axis about which the wheels rotate during operation. Accordingly, the mower may include a rear wheel axis extending laterally between the rotational axis of the pair of rear wheels. The pair of rear wheels may be coupled to the frame and positioned with the rear wheel axis forward of the stand-on operator platform.

Further, a main deck may be coupled to the frame and include one or more main deck blades. The blades may be coupled to spindles that, when engaged (e.g., by a belt or hydraulic motor), cause the blades to rotate. Accordingly, each of the main deck blades rotates about a rotational axis. The main deck may be coupled to the frame such that one or all of the main deck blade rotational axes are positioned forward of the rear wheel axis. Additionally, the mower, in an exemplary aspect, includes at least one deck wing coupled to the main deck. The mower also may also include one or more front wheels positioned forward of the main deck blade rotational axes.

Accordingly, aspects hereof provide for a stand-on mower, which may include a stand-on operator platform, a rear wheel axis positioned forward of the stand-on operator platform, a main deck having main deck blades with rotational axes positioned forward of the rear wheel axis, one or more deck wings, and front wheels positioned forward of the rotational axes of the main deck blades. As a result, a majority of a weight of the mower may be supported by the rear wheels, thereby providing a weight distribution that positions additional weight accompanying the deck wings proximate the rear wheels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

A first exemplary embodiment provides for a stand-on mower having a deck with at least one deck wing. The mower includes a frame and a stand-on operator platform positioned proximate a rear frame end. The mower may be a zero-turn mower having a pair of driven rear wheels that both propel and control the steering of the mower. Each of the rear wheels has a rotational axis about which the wheels rotate during operation. Accordingly, the mower may include a rear wheel axis extending laterally between the rotational axis of the pair of rear wheels. The pair of rear wheels may be coupled to the frame and positioned with the rear wheel axis forward of the stand-on operator platform.

Further, a main deck may be coupled to the frame and include one or more main deck blades. The blades may be coupled to spindles that, when engaged (e.g., by a belt), cause the blades to rotate. Accordingly, each of the main deck blades rotates about a rotational axis. The main deck may be coupled to the frame such that the main deck blade rotational axes are positioned forward of the rear wheel axis. Additionally, the mower includes at least one deck wing coupled to the main deck. The deck wing, which may also be referred to as a "wing deck" or a "wing," may enhance a cutting width of the mower.

The mower also includes one or more front wheels positioned forward of the main deck blade rotational axes. In one aspect, the front wheels are coupled to the mower proximate a front frame end. Additionally, the mower may include an engine (or other power source) coupled to the frame for providing power to the rear wheels and the mowing decks. The engine may have an output shaft positioned proximate the rear wheel axis, and rearward of the main deck blade rotational axes.

Accordingly, in one embodiment, the mower includes a stand-on operator platform, a rear wheel axis positioned forward of the stand-on operator platform, a main deck having main deck blades with rotational axes positioned forward of the rear wheel axis, one or more deck wings, and front wheels positioned forward of the rotational axes of the main deck blades. As a result, a majority of a weight of the mower may be supported by the rear wheels, thereby providing a weight distribution that positions the additional weight accompanying the deck wings proximate the rear wheels.

A second exemplary embodiment provides for a stand-on mower having a stand-on operator platform coupled to a frame proximate a rear frame end, and a rear wheel axis, as described above, positioned at least partially forward of the stand-on operator platform. The mower may also have an engine with an output shaft positioned forward of the rear wheel axis. Additionally, the mower may include one or more deck wings, each having a deck wing blade with a rotational axis positioned forward of the output shaft, and a main deck having one or more main deck blades, each having a rotational axis positioned forward of the rotational axis of the first deck wing blade. The mower may also include a pair of front wheels coupled to the frame proximate the frame front end and positioned forward of the rotational axes of the main deck blades.

In this exemplary embodiment, approximately 55-85% of a weight of the stand-on mower is supported by the pair of rear wheels, and approximately 15-45% of the weight of the stand-on mower is supported by the pair of front wheels. In a more particular aspect of this embodiment, approximately 60-70% of the weight of the stand-on mower may be supported by the pair of rear wheels, and approximately 30-40% of the weight of the stand-on mower may be supported by the pair of front wheels. As provided herein, the weight of the stand-on mower does not include an operator. Further, the weight of the stand-on mower is based on an as-used condition having recommended fluid levels (e.g., fuel, oil, hydraulic fluid), in an exemplary aspect.

Yet another exemplary embodiment provides for a stand-on mower that includes a rear-discharge winged deck. Similar to the above embodiments, the stand-on mower may comprise a stand-on operator platform, a rear wheel axis positioned forward of the stand-on operator platform, a main deck having main deck blades with rotational axes positioned forward of the rear wheel axis, one or more deck wings, and front wheels positioned forward of the rotational axes of the main deck blades. Further, the main deck and deck wings may include rear discharge openings effective to discharge waste (e.g., grass clippings) rearwardly.

In some aspects, the stand-on mower also includes a rear discharge chute extending rearward from the main deck rear discharge opening. The chute may be positioned, for example, between the pair of rear wheels and below the rear wheel axis. Accordingly, the chute may guide grass clippings rearwardly from the main deck and generally beneath the mower.

Further, the deck wings may also include rear discharge openings. The deck wing rear discharge opening may be positioned laterally beyond the rear wheels allowing for the clippings to be expelled without immediately being traversed by the rear wheels. In another aspect, the deck wings include a guide to direct the grass clippings into the rear discharge chute of the main deck. Accordingly, the clippings of the deck wings may be discharged via the main deck and the rear discharge chute.

Aspects hereof may be described using directional terminology. For example, the terms "horizontal" and "horizontally" as used herein refer to direction and describe an orientation generally parallel to the surface of the earth or a longitudinal direction of the stand-on mower frame. Accordingly, the terms "vertical" and "vertically" as used herein refer to a direction perpendicular to, or more perpendicular than parallel to, horizontal. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects.

Further, terminology relating to relative positions of various features of the mower is also used herein. For example, the term "distal" refers to a portion of a feature herein that is positioned further away from a midline of the mower than a portion of a feature referred to by the term "proximal." Additionally, the terms "superior," "superior to," and "above" are intended to mean that features herein are nearer an uppermost portion of the mower than a lowermost portion of the mower, as compared to other features. Accordingly, the terms "inferior," "inferior to," and "below" are intended to mean that features herein are nearer a lowermost portion of the mower than the uppermost portion of the mower, as compared to other features. Further, the terms "forward," and "forward of" are intended to mean that features herein are nearer a frontmost portion of the mower than a rearmost portion of the mower, as compared to other features. Conversely, "rearward," and "rearward of" are intended to mean that features herein are nearer a rearmost portion of the mower than a frontmost portion of the mower, as compared to other features.

Figure 1:
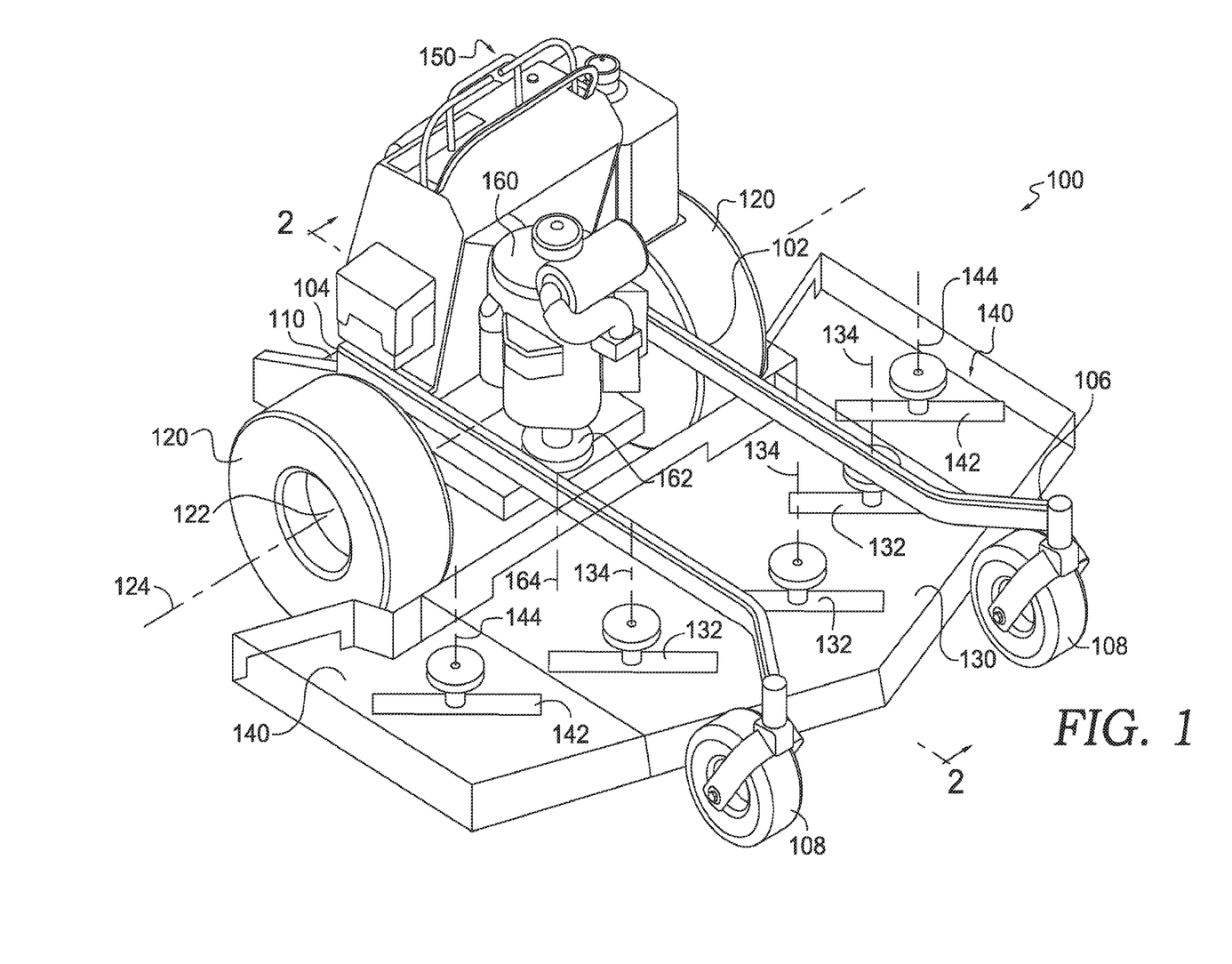
FIG. 1 depicts a perspective view of a stand-on mower having a winged deck, with some parts hidden for clarity, in accordance with aspects hereof.

FIG. 1 depicts an exemplary aspect of a stand-on mower 100, in accordance with aspects hereof. Various features of the mower 100, for example, a top surface of the mowing decks, have been hidden in order to provide a simplified view of the mower 100. Except where otherwise indicated, the relative locations of each of the components of mower 100 will be described in terms of their respective positions along a longitudinal axis.

The mower 100 may include a frame 102 having a rear frame end 104 and a front frame end 106. The frame 102 may provide support for the various components of the mower 100. For example, a stand-on operator platform 110 may be coupled, directly or indirectly, to the frame 102 proximate the rear frame end 104. A pair of rear wheels 120 may also be coupled to the frame 102, directly or indirectly, and may also be positioned proximate or near the rear frame end 104. In some aspects, the mower 100 may be a zero-turn mower driven by the pair of rear wheels 120, which control both the speed and the direction of travel of the mower 100.

The mower 100 may also include a main deck 130 with one or more main deck blades 132, or other cutting mechanisms. The main deck 130 may be positioned generally forward of the rear wheels 120. Further, the mower 100 may include one or more deck wings 140. Although depicted herein as having two deck wings 140, it should be appreciated that the mower 100 may include a single deck wing 140 at either side of the mower 100. The deck wings 140 may be coupled to the main deck 130 such that they are foldable or rotatable relative to the main deck 130. Further, the mower 100 may include at least one front wheel 108 coupled proximate the front frame end 106. In one aspect, the front wheels 108 may be rotatable 360° and, in one example, may be caster wheels. Accordingly, the mower 100 may include an operator platform 110 positioned proximate the rear frame end 104, a pair of rear wheels 120 positioned at least partially forward of the operator platform 110, a main deck 130, at least one deck wing 140 positioned generally forward of the rear wheels 120, and at least one front wheel 108 positioned at least partially forward of the main deck 130. As will be described in more detail below, configuring a stand-on mower 100 in this way provides a weight distribution that transfers or positions a majority of a weight of the mower 100 nearer the rear wheel axis 124 than the front wheels 108. Accordingly, because the mower 100 generally turns about the rear wheel axis 124, positioning the majority of the weight of the mower 100 proximate the rear wheel axis 124 may enhance responsiveness of the steering characteristics of the mower 100.

As can be appreciated, each of the rear wheels 120 has a rotational axis, for example rotational axis 122, as shown in FIG. 1, about which the wheels rotate during operation. Accordingly, a rear wheel axis 124 may extend laterally between the rotational axes 122 of the rear wheels 120. It should be appreciated that as used herein, a "wheel" may include a tire or other ground-engaging mechanism. The rear wheels 120 may be driven, for example, by hydraulic motors (e.g., as shown as element 126 in FIG. 2) coupled thereto that provide a rotational force for driving the rear wheels 120. The motors for driving the rear wheels 120 may also/alternatively be electric, pneumatic, or any other suitable mechanism for providing the rotational force for driving the rear wheels 120. It should also be appreciated that the rear wheels 120 may be driven by other means, for example, an axle or axles, or any other suitable means of transferring power to the rear wheels 120.

With continued reference to FIG. 1, the mower 100 may also include operator controls 150 positioned, for example, generally between the operator platform 110 and the main deck 130. Further, an engine 160 may also be positioned between the operator platform 110 and the main deck 130. In some aspects, the engine 160 may be positioned more proximate the rear wheel axis 124 than the main deck 130. Further, the engine 160 may include an output shaft 162 having an output shaft rotational axis 164. Accordingly, a weight of the engine 160 may also be positioned nearer the rear wheel axis 124 than the front wheels 108.

As mentioned above, the main deck 130 may include multiple main deck blades 132. The main deck blades 132 may rotate about main deck blade rotational axes 134, which are positioned forward of the rear wheel axis 124. Although shown as having two deck wings 140, in some aspects, the mower 100 may include a single deck wing 140. Deck wings 140 may be coupled to the main deck 130 and include a deck wing blade(s) 142, or other cutting mechanism. Similar to the main deck blades 132, the deck wing blades 142 rotate about deck wing blade rotational axes 144. In some aspects, the deck wing blade rotational axes 144 may be positioned behind or parallel to the main deck blade rotational axes 134. The relative positioning of the rotational axes of the blades may affect discharge and/or cutting of the stand-on mower 100 in a forward operation. Also, the relative positioning of the rotational axes of the blades may affect weight distribution of the stand-on mower 100, in exemplary aspects.

Figure 2:
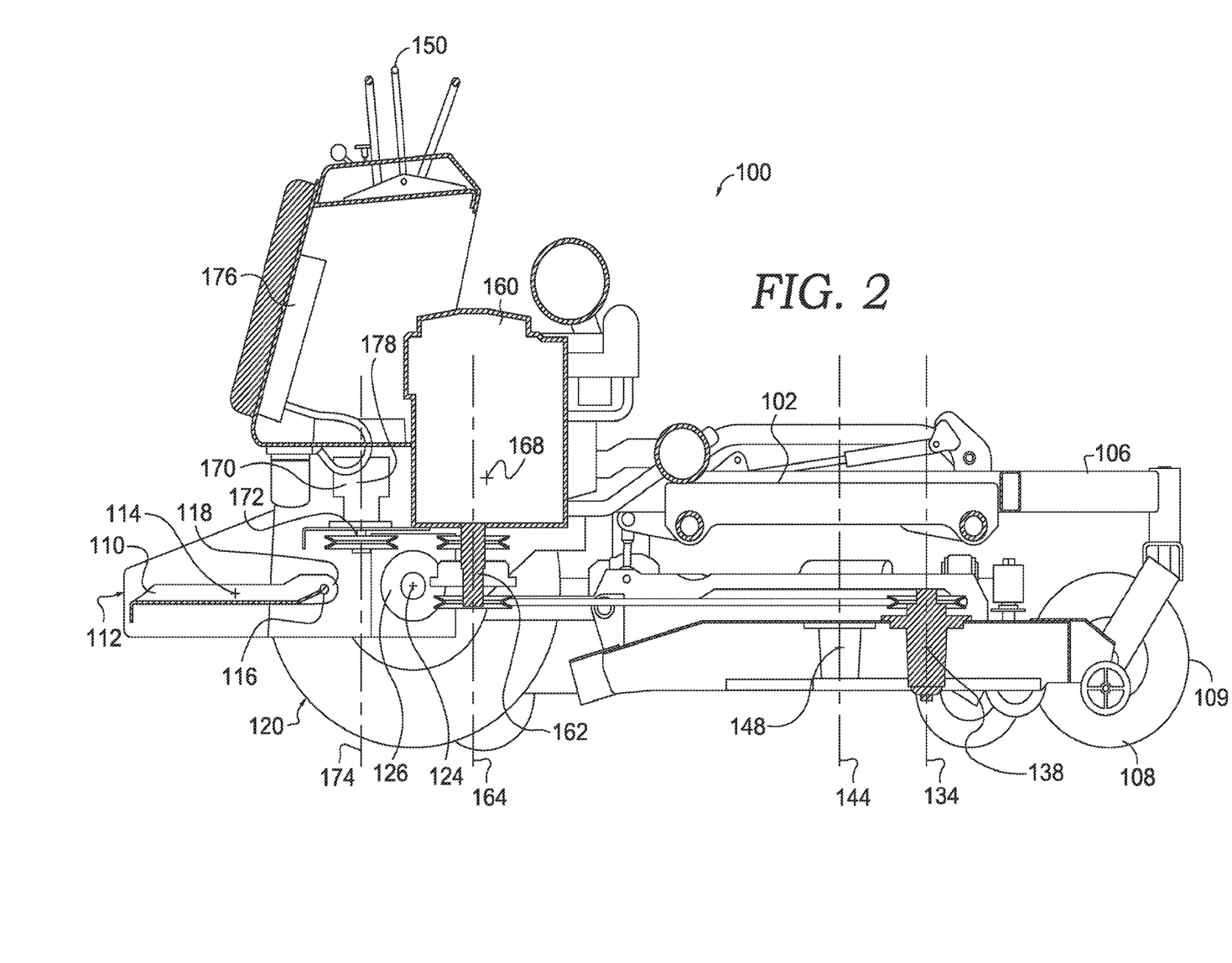
FIG. 2 depicts a cross-sectional view of the mower of FIG. 1, in accordance with aspects hereof.

FIG. 2 depicts a cross-sectional view of the mower 100 according to FIG. 1, taken along line 2 of FIG. 1. Beginning with the rear end of the mower 100, the operator platform 110 may have a rear portion 112 and a front portion 116. As mentioned above, the operator platform 110 may be directly or indirectly coupled to the frame 102, for example at pivot point 118, which provides for a rotational movement of the operator platform 110. Additionally, it is contemplated that one or more vibrational dampening mechanisms may be effective to couple the operator platform 110 to the frame 102, directly or indirectly. Further, the position of the operator platform 110 may be described in terms of a longitudinal center 114 between the rear portion 112 and the front portion 116 of the operator platform 110.

In one aspect, the mower 100 includes hydraulic pumps 170, which may be fluidly coupled to hydraulic motors 126. In some aspects, the hydraulic pump 170 may be belt-driven and include an input shaft 172. The input shaft 172 may turn about an input shaft rotational axis 174. Accordingly, the mower 100 may also include a hydraulic fluid reservoir 176 that is effective to supply or maintain hydraulic fluid for use by one or more of the hydraulic motors and/or hydraulic pump 170. The hydraulic pump 170 and hydraulic fluid reservoir 176 may be positioned, at least partially, forward of the operator platform 110. In one aspect, the input shaft rotational axis 174 may be positioned forward of the operator platform longitudinal center 114, and rearward of the rear wheel axis 124, such that a distribution of weight for the stand-on mower 100 is within an established range, in an exemplary aspect.

Further, as mentioned above, the engine 160 may include output shaft 162 with an output shaft rotational axis 164 positioned forward of the operator platform 110. The output shaft 162 may be effectively connected (e.g., via a belt) to one or more components, such as the hydraulic pumps 170. In one aspect, as shown in FIG. 2, the output shaft rotational axis 164 may be positioned forward of and proximate the rear wheel axis 124. However, as can be appreciated, the engine 160, and output shaft rotational axis 164, may also be positioned above or behind the rear wheel axis 124, in some configurations. Further, the operator controls 150 may be positioned, at least in part, behind the output shaft rotational axis 164 and forward of the operator platform longitudinal center 114. The relative positioning of one or more components provides a distribution of weight within the established range, in an exemplary aspect.

In one aspect, the deck wing blade rotational axes 144 may be positioned forward of the engine 160, and rearward of the main deck blade rotational axes 134. Further, the main deck blade rotational axes 134 may be positioned forward of the deck wing blade rotational axes 144, and rearward of the at least one front wheel 108. Said another way, a frontmost portion of the at least one front wheel 109 may be positioned forward of the main deck blade rotational axes 134. In one aspect, the main deck 130 is coupled to the frame 102, and may be movably suspended therefrom such that the height of the main deck 130 may be modified. However, it should be appreciated that the main deck 130 may be coupled to the mower 100 using any suitable means. For example, in an alternate embodiment (described in more detail below with reference to FIG. 9), the main deck 130 may include steerable wheels (e.g. caster wheels) for supporting the main deck 130 during operation.

Accordingly, the mower 100 may be configured such that the majority of a weight of the stand-on mower 100 is supported by the rear wheels 120, when the stand-on mower 100 is on a level surface, when an operator is not on the mower 100, and the deck wings 140 are folded down. For example, in one aspect, approximately 55-85% of the weight of the stand-on mower 100 is supported by the pair of rear wheels 120, and approximately 15-45% of the weight of the stand-on mower 100 is supported by the pair of front wheels 108. In a more particular aspect, approximately 60-70% of the weight of the stand-on mower 100 may be supported by the pair of rear wheels 120, and 30-40% of the weight of the stand-on mower 100 may be supported by the pair of front wheels 108. In yet another particular aspect, approximately 70-80% of the weight of the stand-on mower may be supported by the pair of rear wheels 120, and approximately 20-30% of the weight of the stand-on mower may be supported by the pair of front wheels 108.

As can be appreciated, the presence of an operator may affect weight distribution. However, the mower 100 may still achieve a weight distribution with a majority of a weight of the stand-on mower 100 supported by the rear wheels 120 when an operator is on the mower 100. For example, using an exemplary operator weight of 200 pounds, approximately 60-85% of the weight of the stand-on mower 100 may be supported by the pair of rear wheels 120, and approximately 15-40% of the weight of the stand-on mower 100 may supported by the pair of front wheels 108.

Referring still to FIG. 2, the mower 100 may be described in terms of a location of a center of mass of the various components thereof. For example, a hydraulic pump center of mass 178 may be positioned forward of the operator platform longitudinal center 114 and rearward of the rear wheel axis 124. An engine center of mass 168 may be positioned proximate to and forward of the rear wheel axis 124. Further, a deck wing center of mass 148 may be positioned forward of the engine center of mass 168, and rearward of a main deck center of mass 138. Further, the main deck center of mass 138 may be positioned forward of the deck wing center of mass 148. As used herein, as an alternative to determining a true center of mass, center of mass may be determined by assuming a uniform density for each of the various components described herein. Accordingly, the center of mass of each of the components may be defined by a centroid, or geometric center, thereof.

Still further, in some aspects, the relative locations of each of the above components may be modified to achieve the above-noted weight distribution. For example, the engine 160 may be positioned behind the rear wheel axis 124 (as opposed to forward thereof), in order to provide a stand-on mower 100 having a weight distribution with approximately 55-85% supported by the pair of rear wheels 120, and approximately 15-45% supported by the front wheels 108. Additionally, the relative locations of the components about a vertical axis and/or a lateral axis may affect weight distribution. Accordingly, the respective vertical and lateral positions of one or more components may also be modified, while still achieving the desired weight distribution. For example, the operator platform 110 could be positioned vertically above, rather than approximately parallel to (as depicted in FIG. 2), the rear wheel axis 124. In another example, the main deck 130 and deck wings 140 may be positioned nearer (relative to their positions depicted in the figures) the rear wheel axis 124 in order increase the weight supported the rear wheels 120. Any such modifications that provide the exemplary weight distributions indicated herein have been contemplated and should be considered within the scope of this disclosure.

Figure 3:
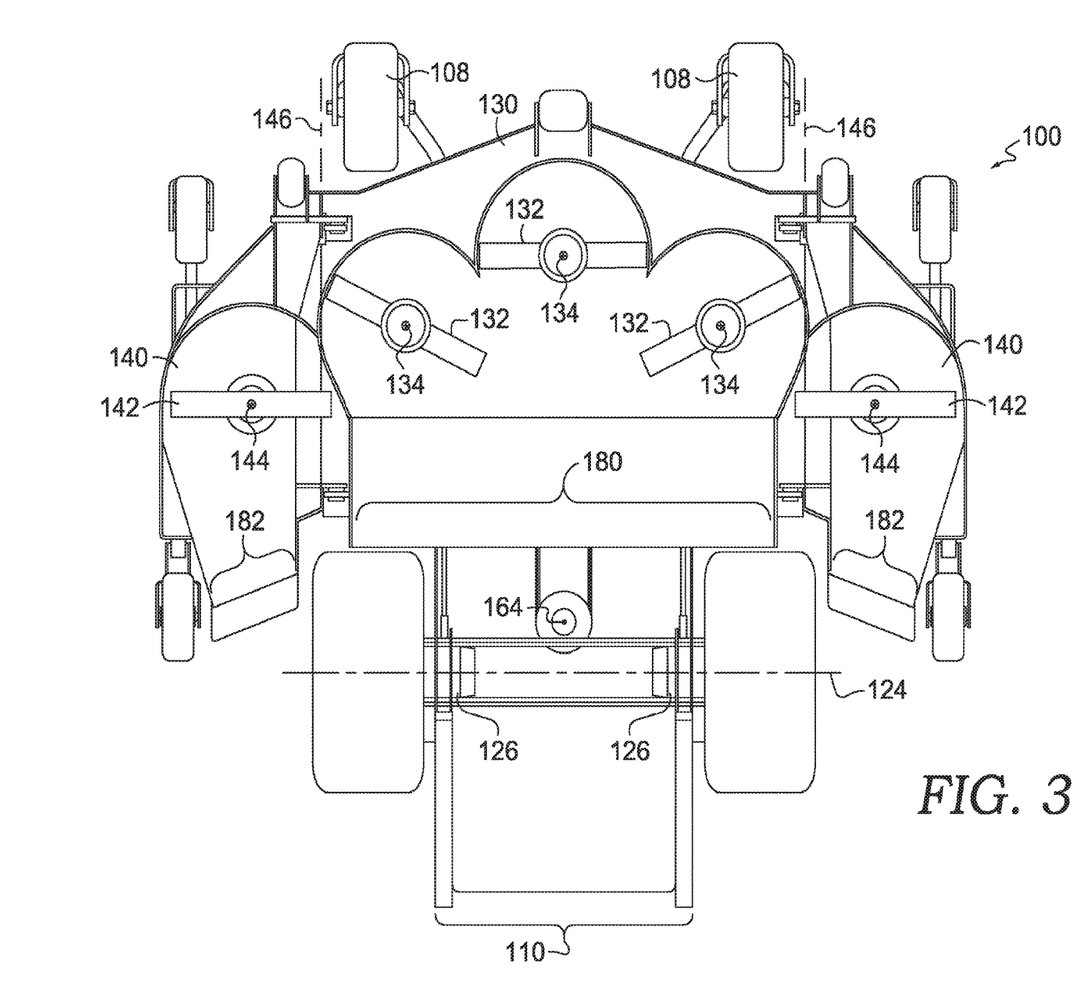
FIG. 3 depicts a bottom view of the mower of FIG. 1, in accordance with aspects hereof.

Turning now to FIG. 3, a bottom view of the mower 100 according to FIG. 1 is depicted. In one aspect, the main deck 130 may include three or more main deck blades 132. The deck wings 140 may be rotatably or pivotably coupled to the main deck 130 between the deck wing blade rotational axes 144 and the outermost main deck blade rotational axis 134, for example, at the location indicated by line 146. Said another way, the deck wings 140 may be pivotably coupled to the main deck 130 at any point between a rotational axis 134 of an outermost main deck blade 132 and the deck wing blade rotational axis 144. Further, although shown as generally being coupled about a longitudinal axis, the deck wings 140 may also be diagonally coupled to the main deck 130. As can be appreciated, any suitable means of coupling the deck wings 140 to the mower 100 and/or the main deck 130 is within the scope of this disclosure.

Further, as shown in FIG. 3, the main deck 130 may have a rear discharge opening 180, and each of the deck wings 140 may have rear discharge openings 182. Although shown here as having a rear discharge opening, it should be appreciated that the main deck 130 and/or deck wings 140 may also comprise a side discharge opening. For example, a side discharge opening may be positioned proximate a lateral edge of the deck wing 140. Additionally, when only one deck wing 140 is coupled to the main deck 130, a side discharge opening may be positioned on the main deck 130 opposite the deck wing 140.

Figure 4:
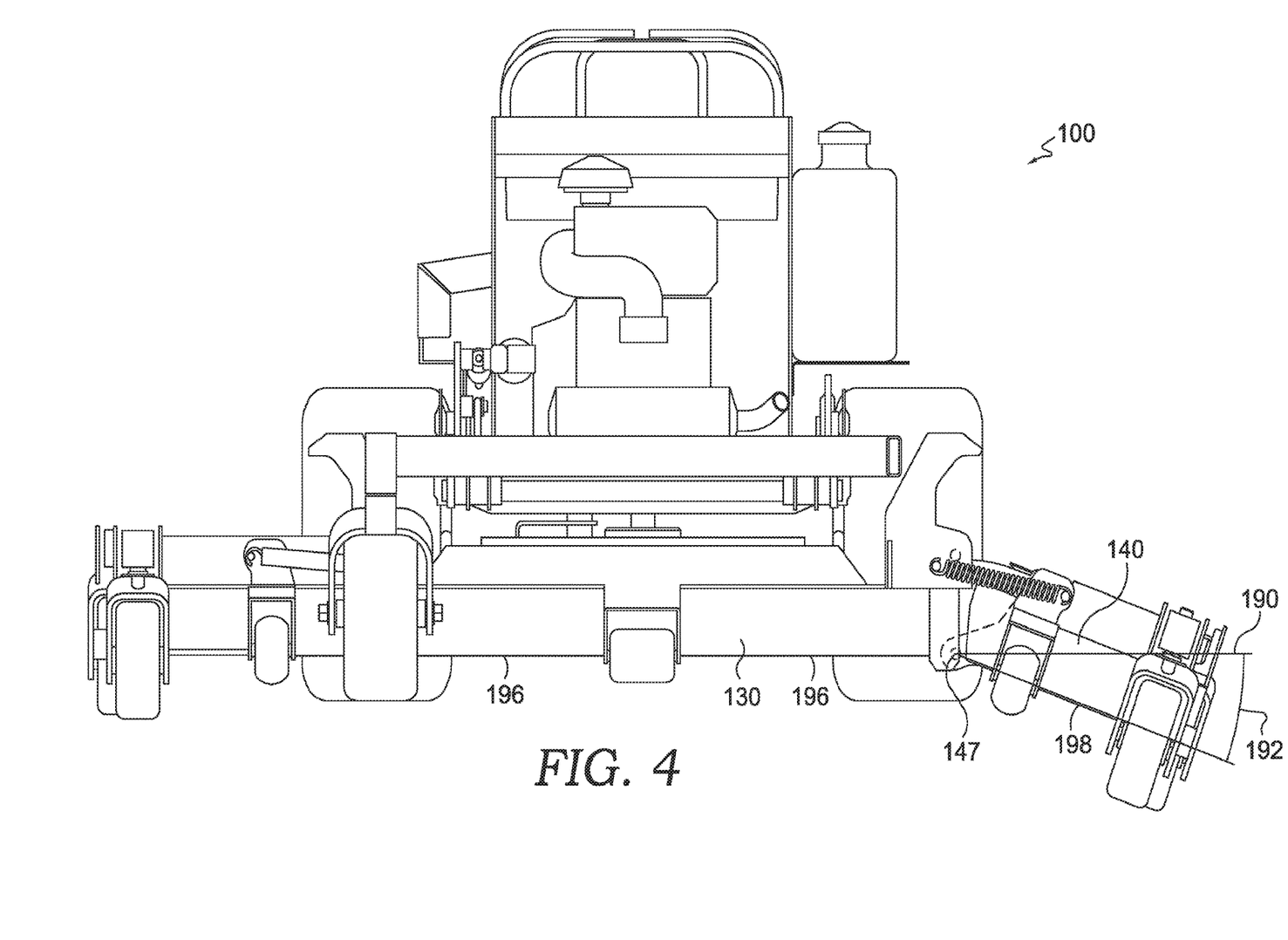
FIG. 4 depicts a front view of the mower of FIG. 1 having a deck wing rotated downward, in accordance with aspects hereof.

As shown in FIG. 4, the deck wings 140, or wings, may be rotatable upward and downward relative to a horizontal plane 190 defined by a bottom surface 196 of the main deck 130. In one aspect, the deck wings 140 may be rotatable downward about a first pivot point 147. A downward angle of rotation 192 of the deck wing 140 may be limited to prevent damage to the surface being mowed and/or the mower 100. In one exemplary aspect, a downward angle of rotation 192 of the deck wing 140 may be limited to not exceed approximately 20°.

Figure 5:
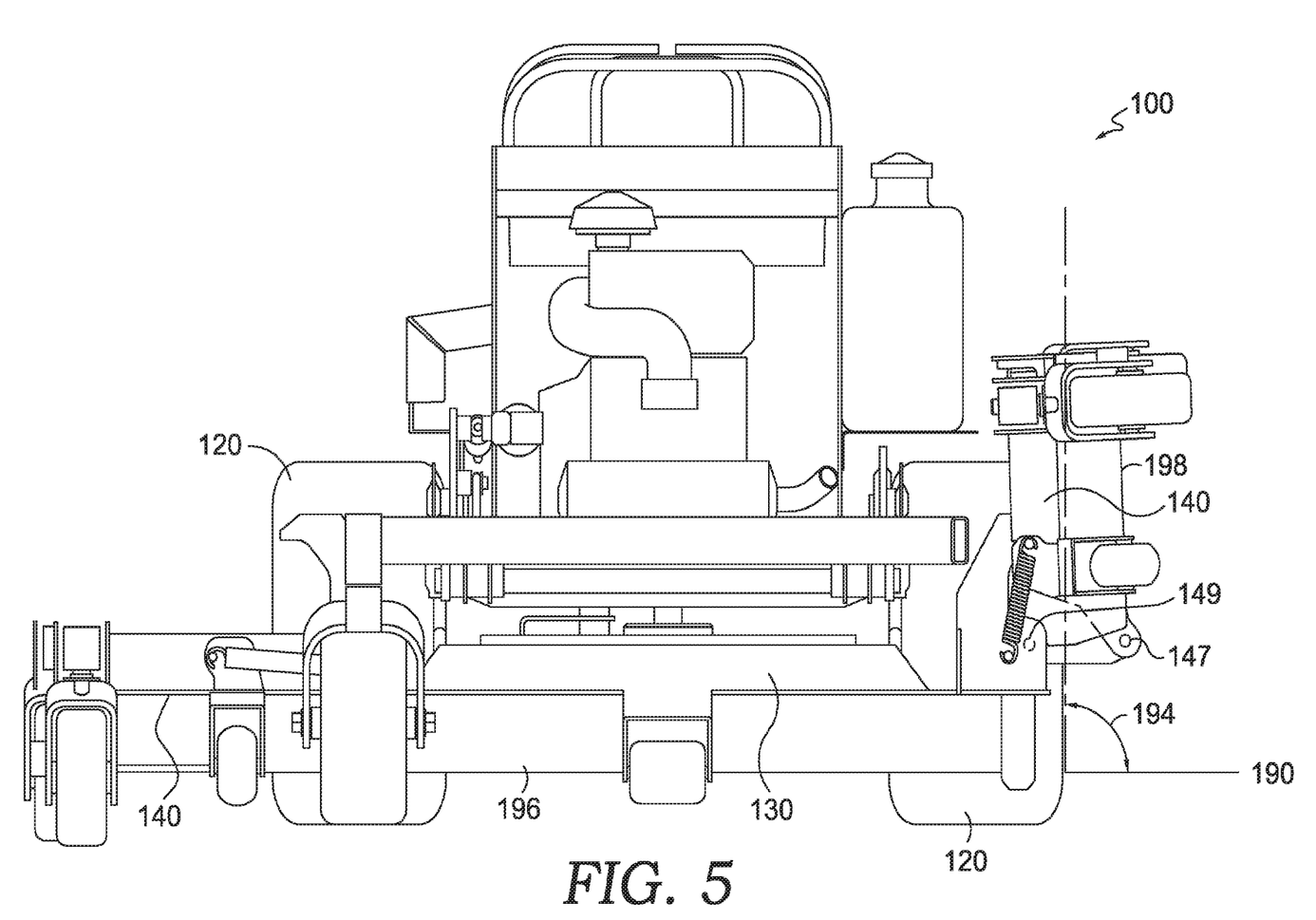
FIG. 5 depicts a front view of the mower of FIG. 1 having a deck wing rotated upward, in accordance with aspects hereof.

Turning now to FIG. 5, the deck wings 140 may be movable upward relative to the horizontal plane 190. For example, the deck wings 140 may be rotatable about the first pivot point 147 and a second pivot point 149. In one aspect, the deck wings 140 may initially rotate about the first pivot point 147 until the deck wings 140 reach a stop, after which the deck wings 140 continue to rotate upward about the second pivot point 149. An upward angle of rotation 194 may be any angle sufficient to secure the deck wings 140 when folded up and secured for transport. In one exemplary aspect, the upward angle of rotation 194 may be greater than 45°, for example.

In some aspects, the deck wings 140 may be rotated manually, for example by an operator, or may be rotated by a powered mechanism. The powered mechanism may be, in one example, a hydraulic actuator, or any other suitable means of rotating the deck wings 140. The deck wings 140 may be rotatable upward such that a width of the mower 100 is decreased, allowing the mower 100 to be placed on a trailer for transport or to fit through narrow openings, such as gates or other standardized openings. As can be appreciated, the width of the mower 100 when the deck wings 140 are folded up may vary, depending on a location of the coupling of the deck wings 140 to the main deck 130 and the upward angle of rotation 194. In one aspect, when folded up, a bottom surface of the deck wings 198 may be laterally beyond, but near, the outermost portion of the rear wheels 120. In another aspect, the deck wings 140 may fold upward such that the deck fits within a width of the stand-on mower 100 extending between the outermost portions of the rear wheels 120. Accordingly, the deck wings 140 may be folded up for storage and/or transport, providing a total width of the mower 100 that is substantially reduced.

Figure 6:
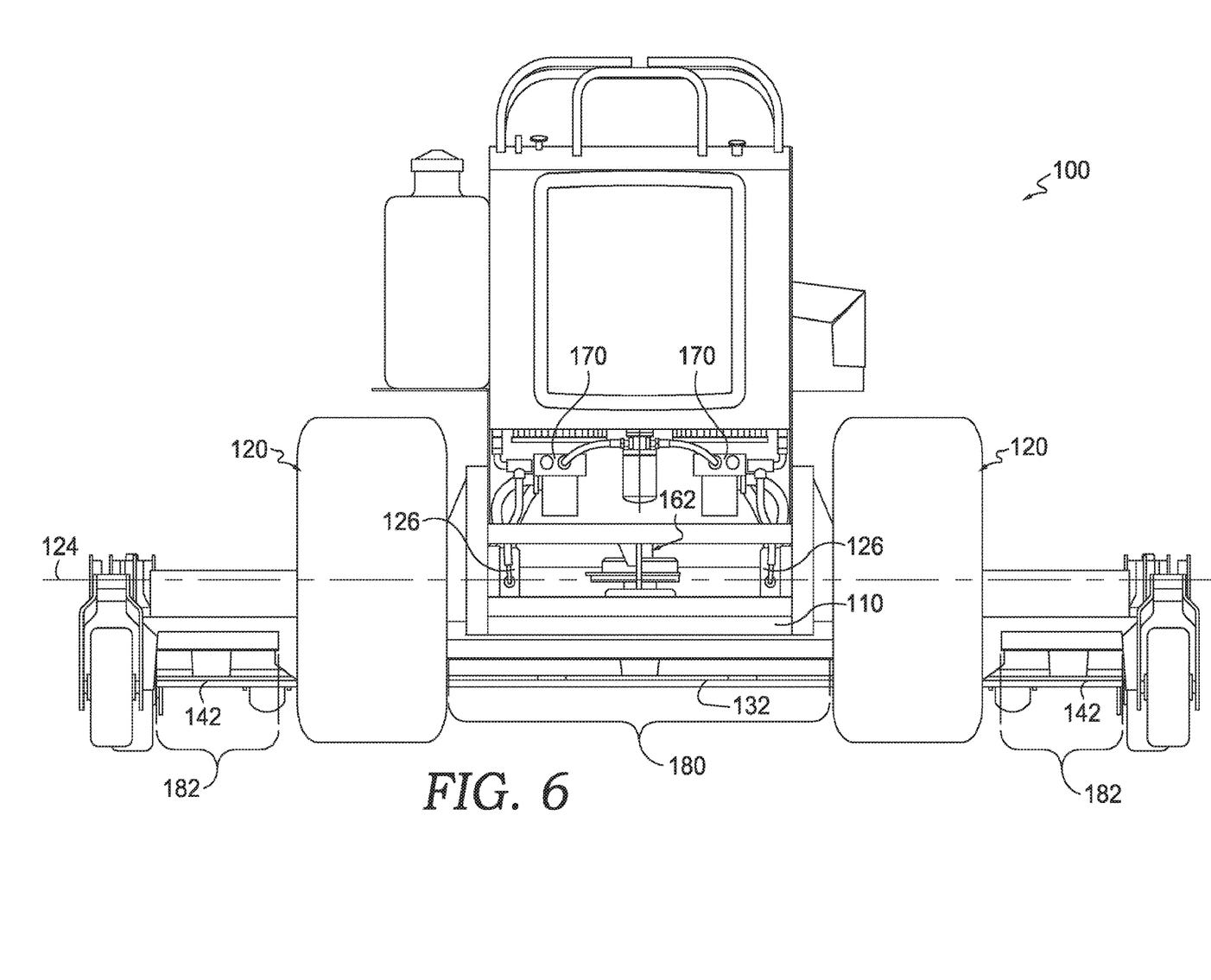
FIG. 6 depicts a back view of the mower of FIG. 1 having a rear discharge winged deck, in accordance with aspects hereof.

FIG. 6 depicts a back view of the stand-on mower 100 having a rear discharge winged deck. As mentioned above, the main deck 130 may include main deck rear discharge opening 180. The main deck rear discharge opening 180 may be positioned below the rear wheel axis 124, the hydraulic motors 126, and the operator platform 110, along with other components of the mower 100. Accordingly, a discharge path from the main deck rear discharge opening 180 may be unobstructed (with the exception of the rear wheels 120) from the main deck 130 beyond the operator platform 110. Further, the deck wings 140 may also include rear discharge openings 182. In one aspect, the deck wing rear discharge openings 182 may be positioned laterally beyond the rear wheels 120, such that grass clippings from the deck wings 140 are discharged outside of a path of the rear wheels 120.

Figure 7:
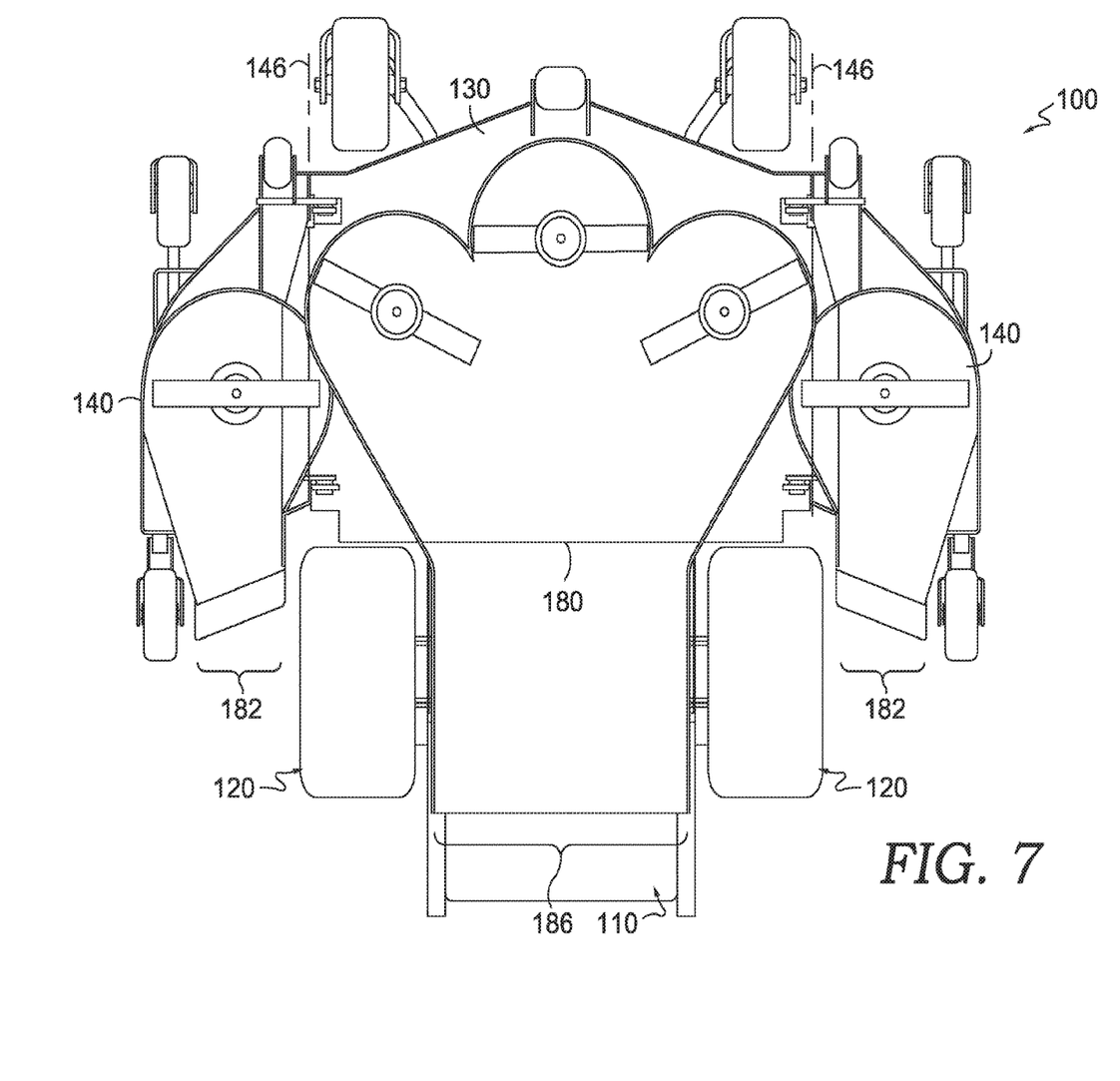
FIG. 7 depicts a bottom view of the mower of FIG. 1 having a first rear discharge chute, in accordance with aspects hereof.

As shown in FIG. 7, in an additional aspect, the stand-on mower 100 also includes a rear discharge chute 186 extending rearward from the main deck rear discharge opening 180. In this aspect, the deck wing rear discharge openings 182 may be separate from the rear discharge chute 186. The rear discharge chute 186 may expel clippings from the main deck blades 132, and the deck wing rear discharge openings 182 may expel clippings from the deck wings 140. The rear discharge chute 186 may be positioned, for example, between the pair of rear wheels 120 and below the rear wheel axis 124. Accordingly, the rear discharge chute 186 may guide grass clippings rearwardly from the main deck 130 and beneath the mower 100.

Figure 8:
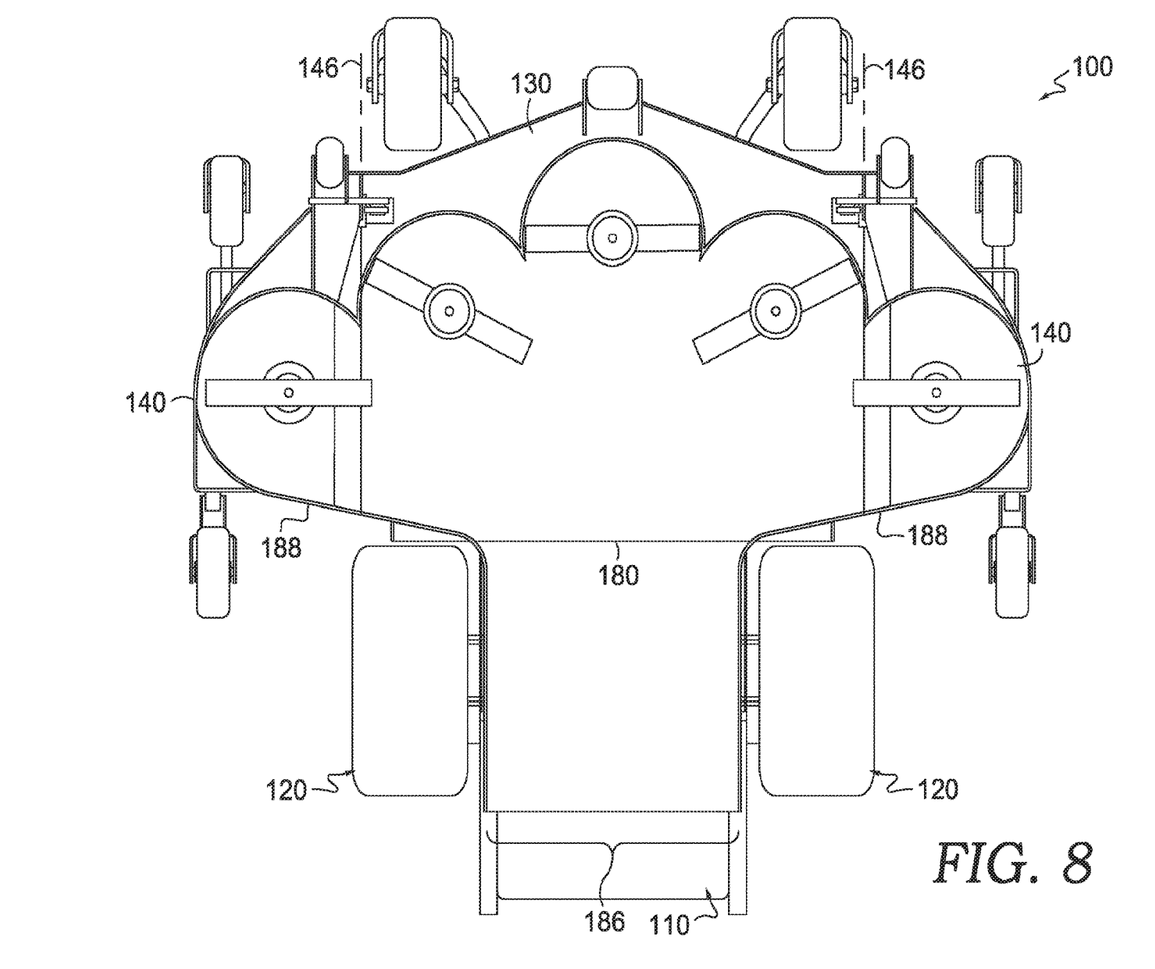
FIG. 8 depicts a bottom view of the mower of FIG. 1 having a second rear discharge chute, in accordance with aspects hereof.

In another aspect, as shown in FIG. 8, the mower 100 may include guides 188 that direct the grass clippings from the deck wings 140 into the rear discharge chute 186 or main deck rear discharge opening 180. Accordingly, the clippings of the deck wings 140 may also be discharged via the main deck rear discharge opening 180 and/or rear discharge chute 186.

Figure 9:
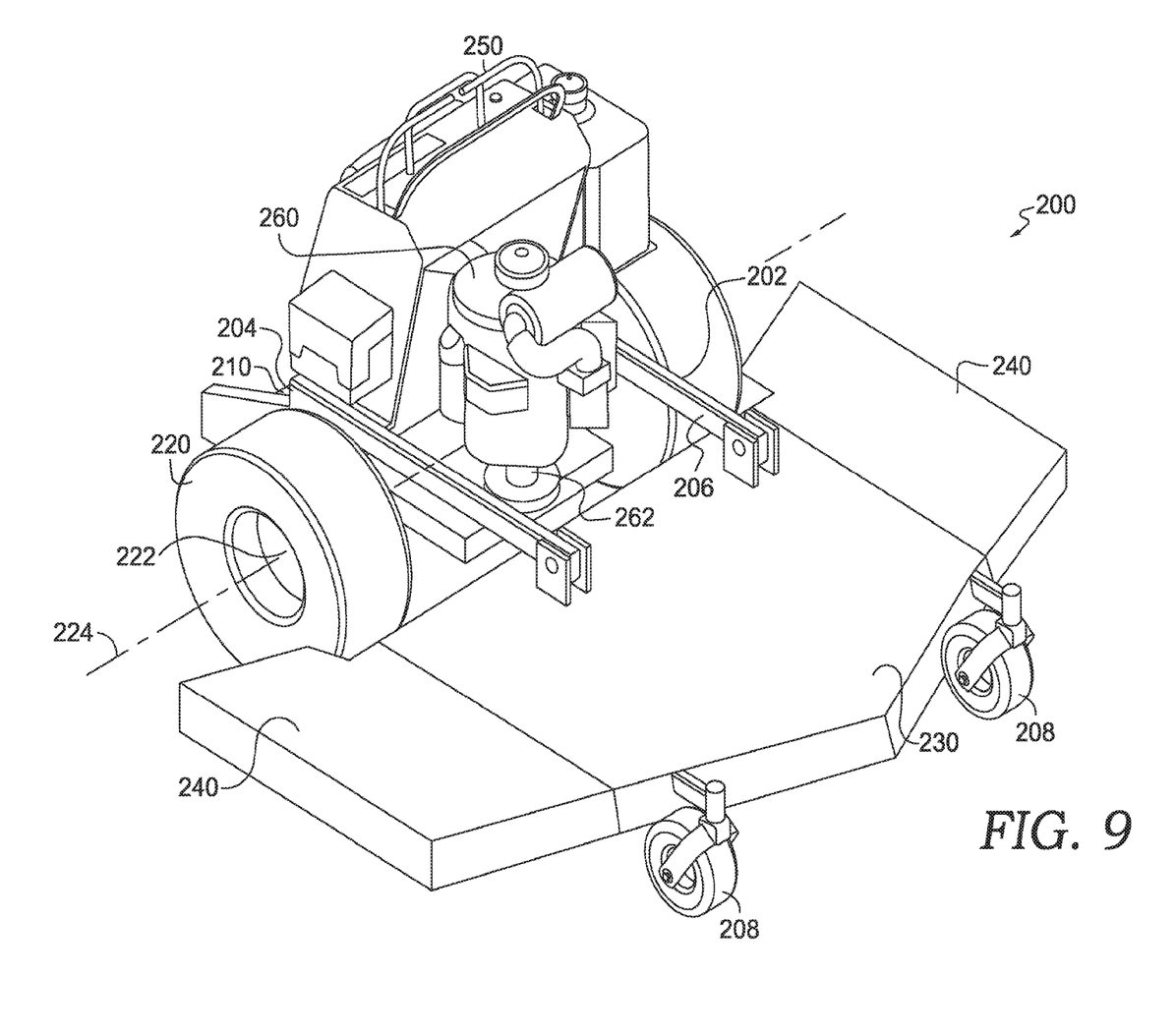
FIG. 9 depicts a perspective view of an alternative embodiment of a stand-on mower having a winged deck, in accordance with aspects hereof.

FIG. 9 depicts an alternate embodiment of a stand-on mower 200 having a winged deck. Similar to the above-described embodiments, the mower 200 may comprise a frame 202 having a rear frame end 204 and a front frame end 206. The mower 200 may include a stand-on operator platform 210 positioned proximate the rear frame end 204. Further, a pair of rear wheels 220 having rotational axes 222 and a rear wheel axis 224 may be coupled to the frame 202 and positioned forward of the stand-on operator platform 210. The mower 200 may also include a main deck 230 and one or more deck wings 240. The main deck 230 may be coupled to the frame 202 proximate the front frame end 206. Further, the mower 200 may include one or more front wheels 208, which, in one aspect, may be coupled to the main deck 230. Further, the mower 200 may also include an engine 260 having an output shaft 262, and operator controls 250.

In some aspects, the main deck 230 and one or more deck wings 240 may be generally V-shaped. Accordingly, the front wheels 208 may be positioned proximate the deck wings 240, such that the front wheels 208 are positioned behind the frontmost portion of the main deck 230. As a result, a front trim point at the front of the stand-on mower 200 may be positioned forward of the front wheels 208. In additional aspects, the main deck 230 may be adjustably coupled to the frame 202, such that a cutting height of the mower 200 may be adjusted. Further, the main deck 230 may be coupled to the frame 202, so that the main deck 230 may be rotated to a position approximately perpendicular to the frame 202. Accordingly, the main deck 230 may be rotated upward (for example to allow for maintenance) to provide access to various components of the main deck 230 and deck wings 240.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A mower comprising:
 a frame having a rear frame end and a front frame end;
 a stand-on operator platform positioned proximate the rear frame end;
 a pair of rear wheels having a rear wheel axis extending laterally between a rotational axis of the pair of rear wheels, the rear wheels coupled to the frame and positioned with the rear wheel axis forward of the rear portion of the stand-on operator platform;
 a main deck coupled to the frame and having a main deck rear discharge opening and a main deck blade with a rotational axis positioned forward of the main deck rear discharge opening;
 a first deck wing hingedly coupled to a first side of the main deck and having a first deck wing rear discharge opening distinct from the main deck rear discharge opening; and
 a pair of front wheels coupled to the frame proximate the frame front end and positioned at least partially forward of the main deck.

2. The mower of claim 1, further comprising a second deck wing moveably coupled to a second side of the main deck and having a second deck wing rear discharge opening distinct from both the main deck rear discharge opening and the first deck wing rear discharge opening.

3. The mower of claim 1, wherein the main deck rear discharge opening is positioned below the rear wheel axis.

4. The mower of claim 1, wherein the rear wheel positioned on the first side is positioned between a center axis extending in a front-to-back direction of the mower and the first deck wing rear discharge opening.

5. A stand-on mower comprising:
 a frame having a rear frame end and a front frame end;
 a stand-on operator platform coupled to the frame proximate the rear frame end;
 a pair of rear wheels having a rear wheel axis extending laterally between a rotational axis of the pair of rear wheels, the rear wheels coupled to the frame and positioned with the rear wheel axis positioned forward of a longitudinal center of the stand-on operator platform;
 a power source positioned forward of the rear wheel axis;
 a main deck having a main deck rear discharge opening and a main deck blade with a rotational axis positioned forward of the output shaft;
 a first deck wing coupled by a hinge to the main deck and having a first deck wing blade with a rotational axis positioned forward of the rear wheel axis wherein the first deck wing includes a first deck wing rear discharge opening distinct from the main deck rear discharge opening; and a pair of front wheels coupled to the frame proximate the frame front end and positioned forward of the main deck blade rotational axis, wherein a rotational axis of the hinge relative to the main deck is positioned between a deck wing blade rotational axis and the main deck blade rotational axis.

6. The stand-on mower of claim 5, further comprising a second deck wing having a second deck wing blade with a rotational axis positioned forward of the rear wheel axis.

7. The stand-on mower of claim 5, further comprising a hydraulic pump fluidly coupled with a rear wheel motor effective to drive at least one of the rear wheels, the hydraulic pump positioned rearward of the rear wheel axis.

8. The stand-on mower of claim 7, further comprising a hydraulic fluid reservoir positioned at least partially rearward of the rear wheel axis.

9. The stand-on mower of claim 5, wherein a rearmost portion of the stand-on operator platform is a rearmost portion of the stand-on mower.

10. The stand-on mower of claim 5, wherein 60-70% of a weight of the stand-on mower is supported by the pair of rear wheels, and wherein 30-40% of the weight of the stand-on mower is supported by the pair of front wheels.

11. The stand-on mower of claim 5, wherein the power source comprises an engine having an output shaft, wherein the output shaft is forward of the rear wheel axis.

12. The stand-on mower of claim 5, wherein the power source comprises an electric motor.

* * * * *